(12) United States Patent
Maleck et al.

(10) Patent No.: US 6,611,912 B1
(45) Date of Patent: Aug. 26, 2003

(54) METHOD AND APPARATUS HAVING A SYSTEM BIOS WRITE CONFIGURATION DATA OF A RISER CARD TO A CONTROLLER CONFIGURATION SPACE WHEN CONNECTING THE RISER CARD TO A MOTHERBOARD

(75) Inventors: Timothy C. Maleck, Austin, TX (US); Charles R. Boswell, Austin, TX (US); Brian Barnes, Round Rock, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 09/498,156

(22) Filed: Feb. 4, 2000

(51) Int. Cl.[7] .............................. G06F 1/24; G06F 9/00; G06F 3/00
(52) U.S. Cl. .............................. 713/100; 713/1; 713/2; 710/8; 710/10
(58) Field of Search .............................. 713/1, 2, 100; 710/8, 10, 15

(56) References Cited

U.S. PATENT DOCUMENTS

| | | | | |
|---|---|---|---|---|
| 4,589,063 A | * | 5/1986 | Shah et al. ..................... | 710/8 |
| 5,446,869 A | * | 8/1995 | Padgett et al. ................. | 703/27 |
| 5,655,148 A | * | 8/1997 | Richman et al. ................ | 710/8 |
| 5,751,975 A | * | 5/1998 | Gillespie et al. ............. | 710/315 |
| 5,835,760 A | * | 11/1998 | Harmer ......................... | 713/2 |
| 5,926,838 A | * | 7/1999 | Jeddeloh ........................ | 711/167 |
| 5,974,554 A | * | 10/1999 | Oh .............................. | 713/300 |
| 5,999,989 A | | 12/1999 | Patel ............................ | 710/1 |
| 6,298,426 B1 | * | 10/2001 | Ajanovic ...................... | 711/172 |
| 6,311,242 B1 | * | 10/2001 | Falkenburg et al. ......... | 710/301 |
| 6,353,885 B1 | * | 3/2002 | Herzi et al. .................. | 713/1 |

FOREIGN PATENT DOCUMENTS

| | | | |
|---|---|---|---|
| GB | 2203869 | 10/1988 | |
| GB | 2203869 A | * 10/1988 | ........... G06F/11/30 |

OTHER PUBLICATIONS

Shanley, T., "Plug and Play System Architecture", 1995, Addison–Wesley Publishing Company, Page(s); 29–34.*
Audio/Modem Riser Specification, Revision 1.01, Intel Corporation, pp 1–24.

* cited by examiner

Primary Examiner—Thomas Lee
Assistant Examiner—James Trujillo
(74) Attorney, Agent, or Firm—Kelly K. Kordzik; Winstead Sechrest & Minick P.C.

(57) ABSTRACT

When a riser card is connected to a computer system motherboard, a storage device on the riser card will contain configuration data permitting the computer system to configure any peripheral device on the riser card. The configuration data will be treated by the BIOS in the computer system as a virtual add-on ROM thereby allowing it to execute and initialize any and all PCI configuration spaces associated with the riser card peripheral devices.

30 Claims, 3 Drawing Sheets

METHOD AND APPARATUS HAVING A SYSTEM BIOS WRITE CONFIGURATION DATA OF A RISER CARD TO A CONTROLLER CONFIGURATION SPACE WHEN CONNECTING THE RISER CARD TO A MOTHERBOARD

TECHNICAL FIELD

The present invention relates in general to data processing systems, and in particular, to autonomous configuration of devices coupled to a data processing system.

BACKGROUND INFORMATION

Modems and audio subsystems are now required components of a Windows based PC (personal computer) according to Microsoft's PC99 specification. This is a requirement for receiving the Microsoft Windows logo. Given the increase in cycle speed in processors, the modem and audio functions are now implemented in software running on the PC processor under Windows operating systems from Microsoft. This is done in order to continue reducing the cost and to provide increased flexibility of software upgrades.

An example of such an implementation is the industry standard called the AMR (audio/modem riser) which defines an architecture consisting of a circuit card or riser card that includes only analog front end hardware for the modem and audio systems. The bulk of the modem and audio processing is done on the host processor. The riser card itself is not a PCI device and is considered a motherboard resource and is therefore not enumerable. Yet a PCI controller is used to provide the interface between the host software and the riser card. The riser contains one or more codecs. The PCI controller may present itself as one or more "PCI devices."

To complicate matters further, the host software drivers for modem and audio as well as the codecs and riser cards are supplied by multiple vendors. For intellectual property protection, a vendor's modem or audio software is designed to only work with their particular codec. Some codec vendors also make riser cards, while some risers are manufactured by companies that do not make codecs. This levies the requirement that the PCI controller be configurable (support multiple Vendor_IDs) in order for Windows to enumerate it properly.

Proper enumeration will cause the intended drivers (supplied by codec vendors) to be loaded. In addition, proper enumeration will allow information to be reported to Windows regarding who made the riser and whose codec components are included. Finally, proper enumeration will also allow the PCI controller to be configured properly, as one or more PCI devices that support the interfacing functions to each codec on the riser.

The computer system's BIOS (basic input output system) enumerates PCI devices by reading the vendor specific information from the PCI configuration space and building a table for the operating system to subsequently load the appropriate drivers.

Currently, the AMR architecture requires that a custom BIOS routine execute in order to detect which specific vendor's riser card is present in the system. The custom BIOS routine then loads in a Vendor_ID into the PCI configuration space as a sub-PCI device ID. Therefore, both the controller, riser, and platform BIOS are "joined at the hip"; all three must be written, tested, maintained, supported, and qualified together. This adds expense and inflexibility.

This "joining" also results in impossible situations. For example, assume that codec vendor A makes both an audio codec, a modem codec, and a PCI controller. Proper enumeration results in two PCI devices being presented to Windows (a controller "A" connected to audio codec "A", and a controller "A" connected to modem codec "A"). However, if a different manufacturer's card were plugged into the riser, other results can occur. The new audio and modem codecs made by vendor "B" can become connected to PCI controller "A." If company A and B are competitors, the result can be very frustrating for the user who is simply instructed by the operating system to find the "A–B" driver.

What is needed in the art is a mechanism that permits device enumeration without any changes to the platform BIOS. What is also needed in the art is a means to enumerate more functionality beyond media access devices resulting in technology advancement of the riser card uncoupled from the platform (BIOS).

SUMMARY OF THE INVENTION

The present invention addresses the foregoing need by allowing an operating system to enumerate multiple PCI devices that are not currently enumerable without customization of the system platform BIOS (basic I/O routines). As a result, the operating system can enumerate such PCI devices without any changes to the platform BIOS, which uncouples the device testing and qualification from the platform, reduces the cost of platform software maintenance by leaving the BIOS unchanged, and uncouples technology advancement of the PCI devices from the system platform BIOS.

More specifically, the present invention provides a process and means for enumeration of multiple devices/functions on a riser card (also motherboard down devices) by making available to the operating system executable code and configuration data without any customization of the platform BIOS. This is accomplished by creating a virtual add-on ROM that the BIOS will detect naturally. A data storage device (e.g., a serial EEPROM) on the riser card will contain the configuration data required for enumeration and also possibly include executable code that will copy the configuration data into the normal PCI configuration space of each device. In one embodiment, the riser serial EEPROM containing configuration data and executable code is copied into an available area of system memory. The serial EEPROM data is structured in system memory so that the BIOS will detect it as it does for add-on ROMs, through the use of an AA55 header. The BIOS will detect this area of system memory when it discovers the AA55 header. The BIOS will treat this area of system memory as an add-on ROM thereby allowing it to execute and initialize any and all PCI configuration spaces with riser configuration. The code executed is able to query the BIOS for other existing PCI peripheral address so that the modem and audio PCI configuration spaces can be located. The BIOS then enumerates all the PCI devices detected in the system.

In another embodiment of the present invention, the configuration data in the EEPROM is treated as a virtual add-on ROM, with optional shadowing of the data to system memory.

One advantage of the present invention is that all riser card related devices can be enumerated without any BIOS customization. Another advantage of the present invention is that riser technology can evolve free of the platform BIOS.

Though the present invention is described with reference to PCI and BIOS entities, the present invention is applicable to any data processing system where extra information or autonomous configuration is required. Furthermore, the present invention is applicable to any system that has a partition with a controller and a media access device (e.g., Ethernet+PHY, DSL hard modem controller+DSP engine, etc.).

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
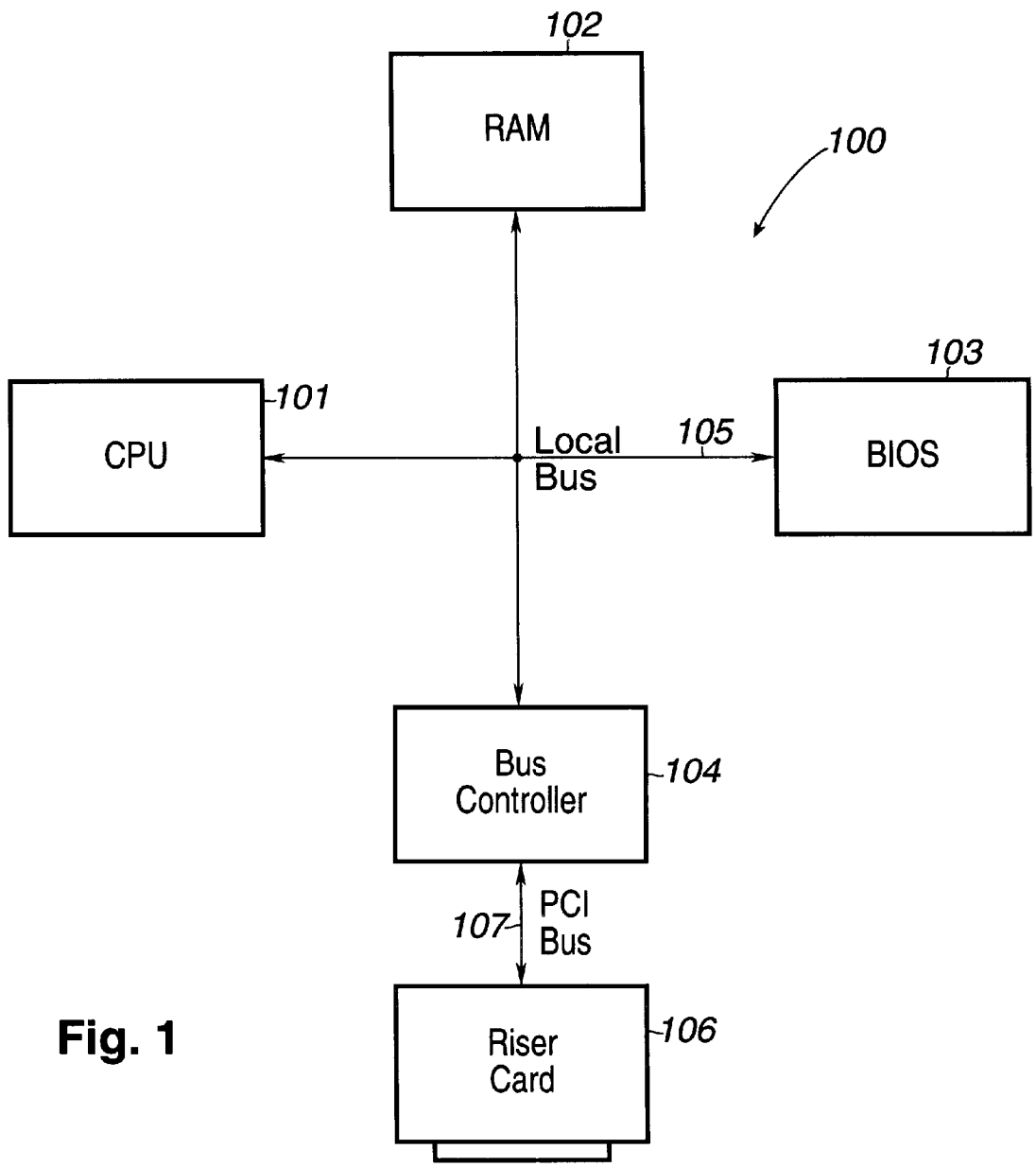
FIG. 1 illustrates a data processing system configured in accordance with the present invention

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 illustrates data processing system 100 configured in accordance with the present invention. Data processing system 100 may include elements other than those specifically illustrated in FIG. 1, which are typically found within a computer system. CPU (central processing unit) 101 is coupled to a random access memory (RAM) 102 by local bus 105. The local bus also couples the CPU 101 to the Basic Input/Output System (BIOS) 103 and a PCI bus controller 104. BIOS 103 includes an essential set of routines and provides an interface between the operating system and the hardware in system 100. BIOS 103 supports all peripheral technologies and internal services such as the realtime clock. On startup of system 100, BIOS 103 tests system 100 and prepares it for operation by querying its own small CMOS memory bank for drive and other configuration settings. It then loads the operating system and passes control to it. The bus control of 104 contains circuitry to run a peripheral device, which in this example, will be a peripheral device on riser card 106. In system 100, bus controller 104 is a PCI bus controller coupled to PCI bus 107. PCI stands for Peripheral Component Interconnect, and the PCI bus 107 is a peripheral bus providing a high-speed data path between the CPU 101 and peripheral devices (audio, video, disk, network, etc.). PCI provides "lug and play" capability, automatically configuring the PCI cards at startup.

During device enumeration within system 100, all devices attached to system 100 are identified and required routines (drivers) are initialized that enable them to function. Registers within the PCI bus controller 104 will be provided with the particular information on the peripheral device on riser card 106 so that the bus controller 104 can properly communicate with the peripheral device.

In one example of the present invention, riser card 106 is an audio modem riser (AMR) that permits manufacturers to create motherboards without analog I/O functions. Instead, these functions are placed on the riser card, which will include codec circuitry, which plugs in perpendicular to the motherboard so that the motherboard and riser card 106 form a right angle. Separating the analog I/O functions from the motherboard can result in higher audio quality and reduced production delays. Prior to the AMR specification, motherboard analog I/O functions went through a lengthy FCC and international telecom certification process.

Figure 2:
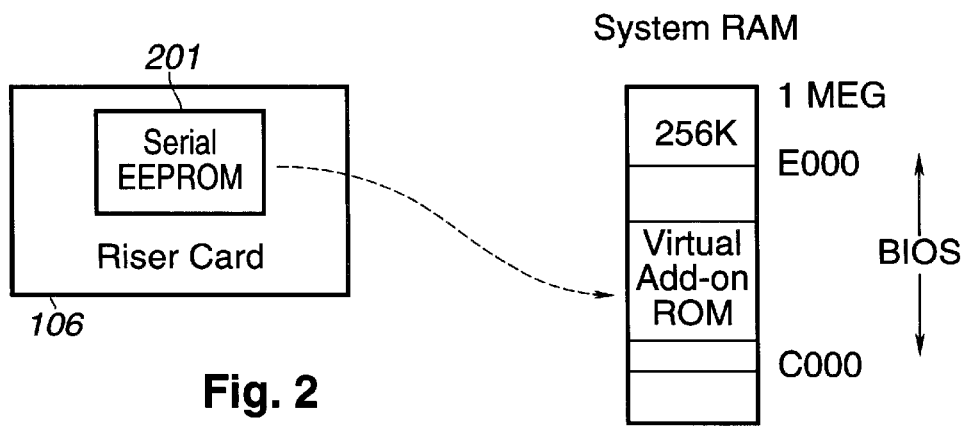
FIG. 2 illustrates copying of information within a EEPROM in a riser card to system memory.

The present invention provides a process and means for enumeration of multiple devices/functions on the riser card 106 by making available to system 100 executable code and configuration data without any customization of the platform BIOS 103. This is accomplished by creating a virtual add-on ROM that the BIOS 103 will detect during startup of system 100 naturally. Referring to FIG. 2, a data storage device, such as a serial EEPROM 201 is connected onto the riser card 106, and will contain all the configuration data required for full enumeration of any peripheral devices on the riser card 106. As an example, there may be one or more audio or video peripheral devices on riser card 106, such as a modem. Serial EEPROM 201 will also possibly include executable code that will copy the configuration data into the normal PCI configuration space of each device, making normal enumeration possible. Since the host system 100 cannot execute directly from the riser-based storage device 201, the data within device 201 may first be copied into available system RAM, as shown by the dashed arrow in FIG. 2.

Figure 3:
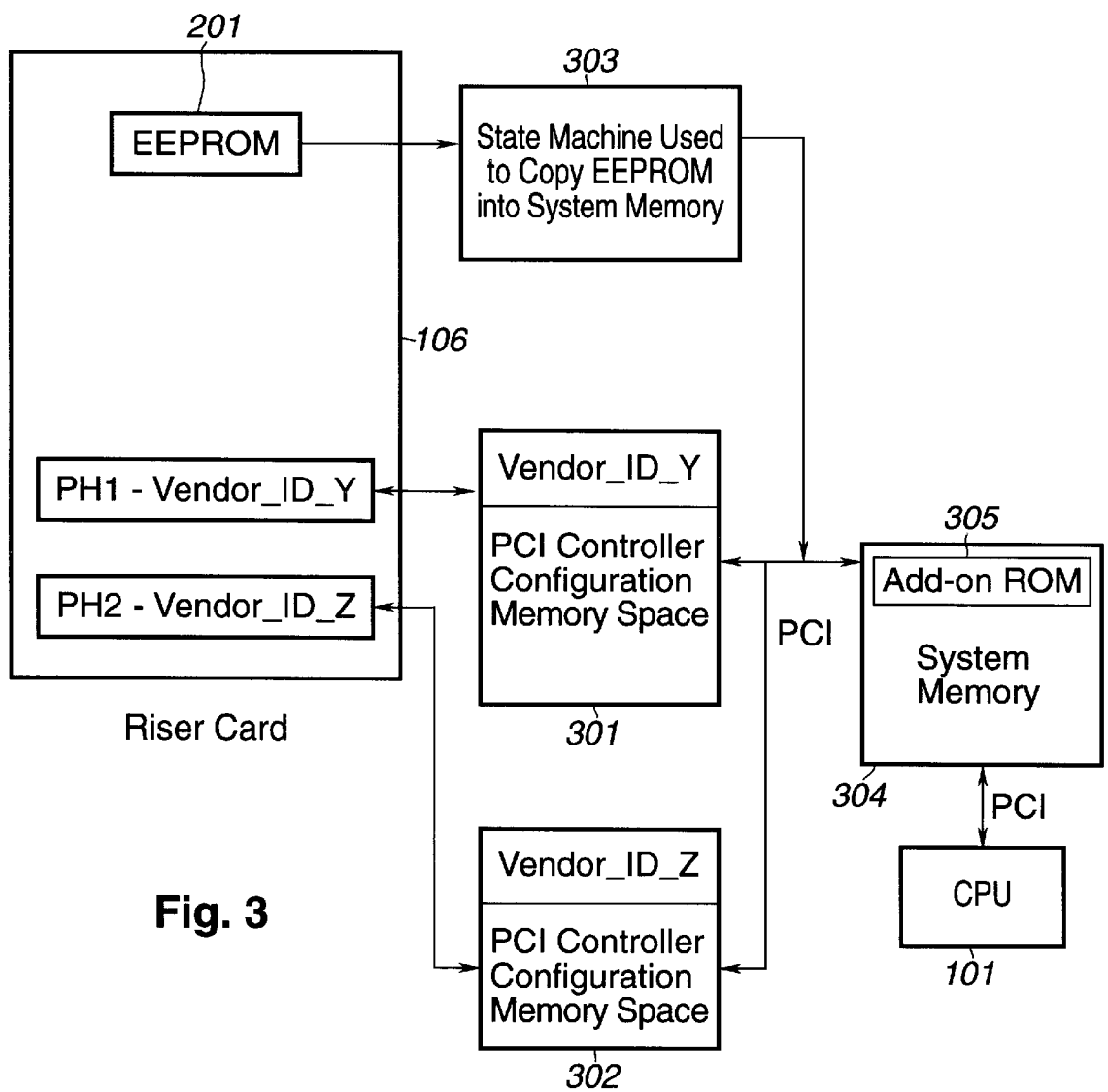
FIG. 3 illustrates execution of instructions within an add-on ROM resulting in copying of vendor information into PCI configuration spaces.

Referring next to FIG. 3, there is illustrated a block diagram illustrating execution of the present invention. As noted above, riser card 106 will include a EEPROM storage device 201. A means 303 will be implemented for copying the configuration data required for full enumeration of the peripheral devices on riser card 106 and any possible executable code into system memory 304. Such data will be structured in system memory 304 so that the BIOS 103 detects it as an add-on ROM 305. This is accomplished by placing the header AA55 at the front of the data copied into system memory 304. It is well known in the art that the BIOS 103 has a provision whereby it automatically searches through certain locations and memory and looks for the AA55 header. Data having such a AA55 header will be assumed to be an add-on ROM at that location in system memory 304, and the BIOS 103 will automatically execute the data contained therein. The data contained within the add-on ROM 305 will execute and perform the initialization of any and all PCI configuration spaces for the any peripheral devices included on riser card 106. In the example illustrated in FIG. 3, for a first peripheral device PHY1, its Vendor_ID_Y will be stored within the PCI controller configuration memory space 301. Illustrated in FIG. 3 is another peripheral device PHY2, whose Vendor_ID_Z data will be stored in the PCI controller configuration memory space 302. The BIOS 103 will then enumerate these "PCI devices" that have been detected.

To further describe in more detail what is performed by state machine 303, state machine 303 may have a default power on condition that causes it to start copying the contents of the EEPROM storage device 201 into a part of system memory 304 known to contain add-on ROMs. The state machine 303 then monitors the BIOS add-on ROM detection algorithm. When the BIOS 103 does a read operation from the base address of the copied EEPROM image, the state machine 303 must pull the memory read line active. This is because the BIOS 103 is checking I/O space, which has a different read control signal. The first byte of executable code in the EEPROM image notifies the CPU 101 to start executing code from system memory 304. This means the state machine 303 can stop monitoring the operation, since control was successfully transferred. The final code in the EEPROM storage device 201 returns control of the power on procedure to the BIOS 103.

Alternatively, in block 303, the PCI controller may be presented as the add-on ROM device. The present invention will treat the serial EEPROM device 201 and the PCI controller as an add-on ROM without any copying of the EEPROM 201 contents into system memory 304 but rather executes it in place. This removes the complexity of copying the data in EEPROM 201 into system memory 304. Performance can be enhanced by "shadowing" the data in the EEPROM 201 into system memory 304 (controlled by a BIOS setting). This "shadowing" is a well-known mechanism that exists in the platform BIOS that will automatically copy the memory into system RAM. This will enhance the execution performance by lowering access time to ROM data (executes from system RAM after copying). As a result, the PCI controller 104 (or a simple state machine device) that interfaces with the riser EEPROM 201 is made to respond to the address range that will make it appear as an add-on ROM device. BIOS 103 will discover it as an add-on ROM and pass program execution to this device.

Essentially, this alternative shadowing procedure is the same as the procedure described above with respect to the copying of the image into system memory, except that the option to shadow the add-on ROM into main memory is turned on. After the entire ROM image is copied into system memory 304, the BIOS 103 then traps any requests to access the original memory location and redirects it to the copy it made. This option is typically in the BIOS configuration screen accessible to the user. It can also be done by executable code stored in the EEPROM image. Most likely, this option is turned on by the OEM (original equipment manufacturer) by default, since it makes the image accesses significantly faster, since main system memory 304 is much faster than the EEPROM 201.

In another alternative, a state machine controller for the EEPROM 201 actually responds to the read request of the BIOS 103 with the AA55 header. No retranslation is required, since the state machine 303 responds directly in a standard fashion. When an address read from the EEPROM 201 is requested, the state machine 303 translates the request and presents the data to the system when it is ready. This method is easy to implement, since only standard signaling is needed. The technique of shadowing as described above would also work in this instance, making the access faster.

As to the stored data, it is the same across all the above described methods. It identifies which device(s) are present on the riser card. This includes manufacturer, model, revision, and any other information the vendor desires. It also has the PCI vendor ID, subvendor ID, PCI class, and, again, anything else the vendor thinks appropriate. If the vendor has special executable code, this is where it would live. The minimum executable code will query the system for available controllers. If it finds any, it will read the PCI ID, device ID, and any other data the vendor believes appropriate to identify the device. Once each media device (riser PHY/CODE, etc.) has found a matching controller, the code in the EEPROM image will write the correct PCI vendor ID, subvendor ID, device ID, etc. into the matching controller, until each device has been properly defined. This information could also include power management capabilities or any other information the system designer needs to include.

Once the EEPROM code is finished operating, the BIOS 103 does a standard PCI discovery cycle, and since the PCI configuration is already completed, devices enumerate correctly and the operating system can load a known good driver.

Figure 4:
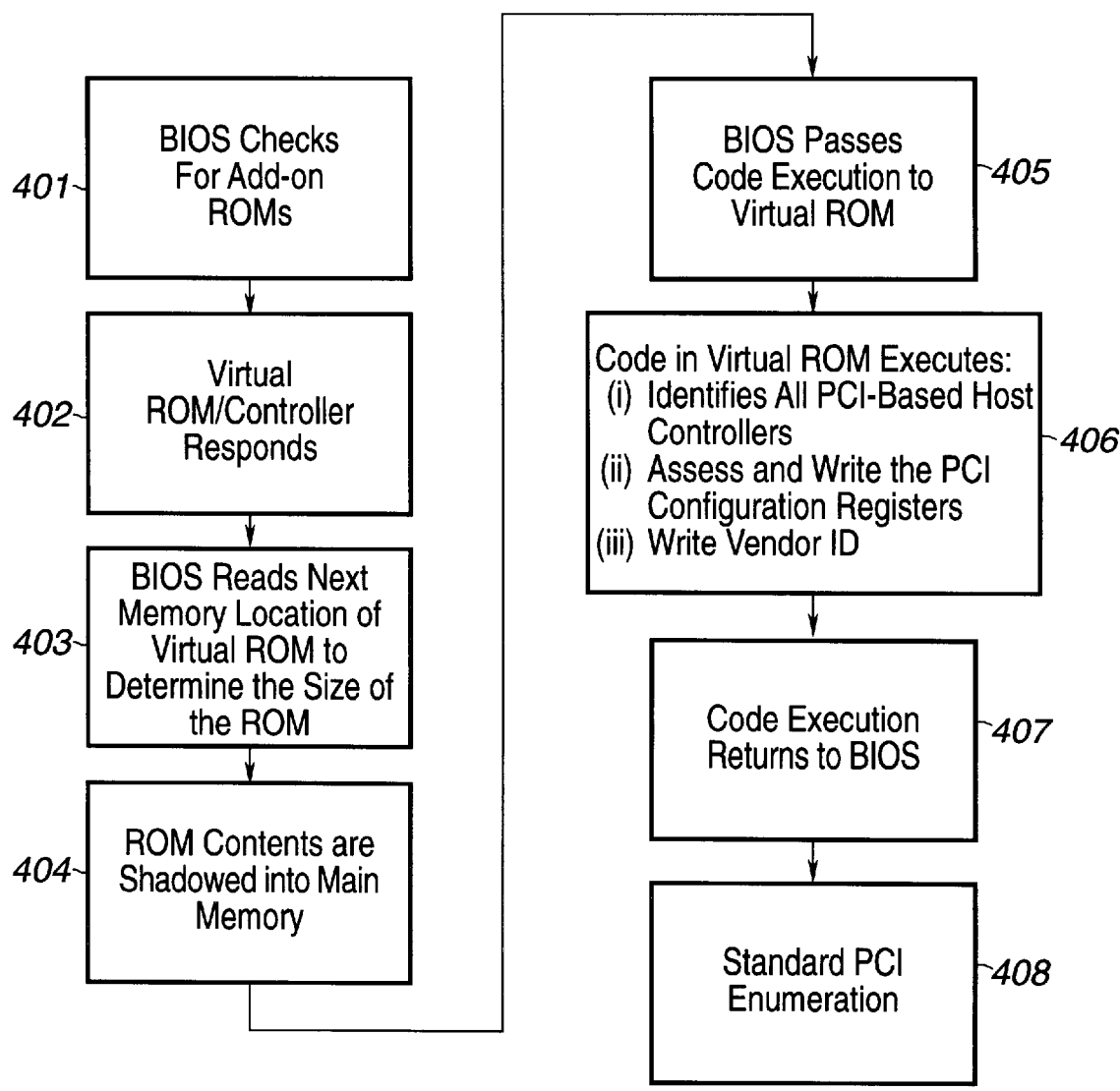
FIG. 4 illustrates a flow diagram in accordance with the present invention.

FIG. 4 illustrates in further detail the foregoing process. In step 401, BIOS 103 checks for any add-on ROMs. In step 402, the virtual ROM/controller responds to a memory read from system memory 304 with the appropriate AA55 16-bit memory value. In step 403, the BIOS 103 reads the next memory location of the virtual ROM 305 to determine its size. In step 404, the contents of the virtual ROM 305 are shadowed into main memory 304. In step 405, using industry-standard protocols, the BIOS 103 passes code execution to the virtual ROM 305. In step 406, the virtual ROM 305 will contain executable code that performs the following actions. First, it identifies all PCI-based host controllers through a standard PCI enumeration cycle. This may be accomplished under two possible methods. First, the PCI SIG group will assign to the riser card 106 only controllers having a special PCI ID number. A second possible enumeration cycle is to place all host controllers on an unused but standard PCI logical bus.

Since the ROM programmer has knowledge of exactly which controllers are potentially available, the programmer also knows how to access and write the PCI configuration registers in the various PCI host controllers.

The third action performed by the virtual ROM is that the Vendor_ID number assigned to the riser component is written into the appropriate PCI configuration register of the host controller 104. This may be the sub-vendor or subsystem ID; it is left to the system designer to select the appropriate register. Thereafter, the fourth process performed by the virtual ROM executable is the repeated writing of the riser device IDs for all device-controller pairs in system 100.

Thereafter, in step 407, code execution is returned to the BIOS 103 after all configuration is completed. While the foregoing example only refers to PCI ID registers, it is believed that some device-specific actions could also take place if the designer so chooses. Thereafter, in step 408, as the normal BIOS/PC power-on procedure continues, a standard BIOS-based PCI enumeration cycle occurs. Since all required PCI ID numbers have already been written, all PCI riser devices enumerate correctly to the PCI BIOS and the operating system can then load the proper corresponding drivers.

Although the present invention and its advantages have been described in detail, it should be understood that various changes, substitutions and alterations can be made herein without departing from the spirit and scope of the invention as defined by the appended claims.

What is claimed is:

1. In a data processing system, a method for enumerating a device on a riser card plugged into a motherboard containing a processor and a BIOS, comprising the steps of:

storing configuration data for the device on a storage device on the riser card;

including a header with the configuration data so that a storage location containing the configuration data is treated by the BIOS as an add-on ROM;

writing, by the BIOS, the configuration data into a controller configuration space; and enumerating the device using the configuration data.

2. The method as recited in claim 1, wherein the controller configuration space is a PCI controller configuration space and a PCI bus couples the riser card to a PCI bus controller coupled to the system.

3. The method as recited in claim 2, wherein the header is AA55.

4. The method as recited in claim 2, further comprising the step of shadowing contents of the add-on ROM into system memory.

5. The method as recited in claim 2, wherein the device is a peripheral device.

6. The method as recited in claim 1, wherein an interface coupled to the storage device is treated as the add-on ROM.

7. The method as recited in claim 6, wherein a PCI controller is the interface.

8. The method as recited in claim 6, wherein a state machine is the interface.

9. The method as recited in claim 1, wherein the including step further comprises the step of copying the configuration data from the storage device to an area in system memory, wherein the area in system memory is treated as the add-on ROM.

10. The method as recited in claim 9, wherein the copying step further comprises the step of shadowing the configuration data into the system memory.

11. The method as recited in claim 1, wherein the storage device is not an add-on ROM.

12. The method as recited in claim 1, wherein the storage device is an EEPROM.

13. The method as recited in claim 1, further comprising the step of copying the configuration data into system memory with the header appended thereto so that the BIOS will detect the configuration data.

14. The method as recited in claim 1, wherein the including step further comprises the step of copying the configuration data from the storage device into a PCI configuration space.

15. A riser card adaptable for connecting to a computer system motherboard, the riser card comprising:

a peripheral device; and a computer program product stored on a storage device on the riser card, the computer program product including configuration data operable for use by a system BIOS for writing to a PCI configuration space when the riser card is connected to the computer system.

16. The riser card as recited in claim 15, wherein the computer program product includes data that structures the configuration data so that the BIOS detects the configuration data as an add-on ROM.

17. The riser card as recited in claim 16, wherein the riser card is adaptable for connecting to the computer system motherboard by a PCI bus.

18. The riser card as recited in claim 15, wherein the storage device is not an add-on ROM.

19. The riser card as recited in claim 15, wherein the storage device is an EEPROM.

20. The riser card as recited in claim 15, wherein the computer program product includes data for copying the configuration data into system memory with the header appended thereto so that the BIOS will detect the configuration data.

21. A data processing system comprising:

a motherboard including a processor and a BIOS;

a bus controller coupled to the processor and the BIOS; and a riser card coupled to the motherboard through the bus controller, wherein the riser card includes a peripheral device and a storage device for storing configuration data associated with the peripheral device;

circuitry for treating the configuration data by the BIOS as an add-on ROM;

circuitry for writing, by the BIOS, the configuration data into a controller configuration space; and circuitry for enumerating the peripheral device using the configuration data.

22. The system as recited in claim 21, wherein the controller configuration space is a PCI controller configuration space and a PCI bus couples the riser card to a PCI bus controller coupled to the system.

23. The system as recited in claim 21, further comprising circuitry for shadowing contents of the add-on ROM into system memory.

24. The system as recited in claim 21, wherein the treating circuitry further comprises circuitry for copying the configuration data from the storage device to an area in system memory, wherein the area in system memory is treated as the add-on ROM.

25. The system as recited in claim 24, wherein the circuitry for copying includes circuitry for including a header with the configuration data so that the BIOS treats the area in the system memory as the add-on ROM.

26. The system as recited in claim 25, wherein the header is AA55.

27. The system as recited in claim 21, wherein the storage device is not an add-on ROM.

28. The system as recited in claim 21, wherein the storage device is an EEPROM.

29. The system as recited in claim 21, further comprising circuitry for copying the configuration data into system memory with the header appended thereto so that the BIOS will detect the configuration data.

30. A method comprising the steps of:

a BIOS checking for add-on ROMs;

a virtual ROM controller responding to a memory read from system memory with an appropriate AA55 memory value;

the BIOS reading a next memory location of the virtual ROM to determine its size;

shadowing contents of the virtual ROM into main memory;

the BIOS passing code execution to the virtual ROM;

the virtual ROM containing executable code that performs a first action that identifies all PCI-based host controllers through a standard PCI enumeration cycle, a second action that accesses and writes to PCI configuration registers, and a third action to write a vendor ID number into the appropriate PCI configuration register of the host controller;

returning code execution to the BIOS after all configuration is completed; and performing a standard BIOS-based PCI enumeration cycle.

* * * * *